July 31, 1962     K. STEISSLINGER     3,046,858

INDICATOR MECHANISMS FOR PHOTOGRAPHIC CAMERAS

Filed Jan. 18, 1960

KURT STEISSLINGER
*INVENTOR.*

BY R. Frank Smith

Robert W. Hampton

ATTORNEYS

3,046,858
INDICATOR MECHANISMS FOR PHOTOGRAPHIC CAMERAS

Kurt Steisslinger, Stuttgart-Hedelfingen, Germany, assignor to Eastman Kodak Company, Rochester, N.Y.
Filed Jan. 18, 1960, Ser. No. 3,121
Claims priority, application Germany Mar. 25, 1959
4 Claims. (Cl. 95—10)

The present invention relates to photographic cameras having semiautomatic exposure control systems wherein the instrument pointer of an exposure meter is matched by a follow-up pointer coupled to one or more exposure regulating mechanisms in order to adjust the camera for proper exposure. More particularly the invention relates to means enabling the pointer to be matched, at the selection of the camera operator, either in a window in the top of the camera housing or in a finder viewed from the rear of the camera.

Cameras having semiautomatic exposure control systems are well known. In some of these cameras, the instrument pointer may be observed from either of two positions, but frequently the fragile pointer must be bent into a complicated shape for this purpose.

It is therefore a primary object of the invention to provide a semiautomatic exposure control system in a photographic camera wherein the exposure meter instrument has a pair of straight pointers, one of which is observable through a window in the top housing of the camera, the other being observable through a finder that is viewed from the rear of the camera.

It is a further object of the invention to provide a single follow-up pointer cooperating with both of the instrument pointers of a camera as defined in the foregoing object.

A further object of the invention with respect to such cameras is to provide a follow-up pointer having a free end cooperating with one instrument pointer and having an aperture defining a second pointing device cooperating with a second instrument pointer.

Other objects of the invention will appear from the following description, reference being made to the accompanying drawings, wherein.

Figure 1:
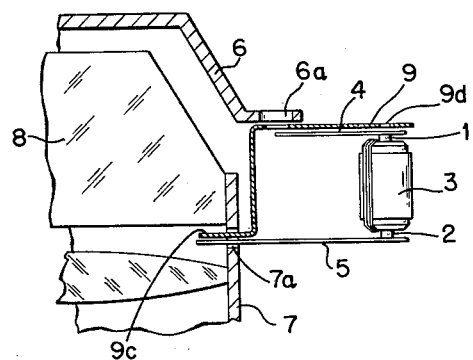
FIG. 1 is a partial rear view, in section, of an exposure meter according to the invention, incorporated into a single-lens reflex camera.
Figure 2:
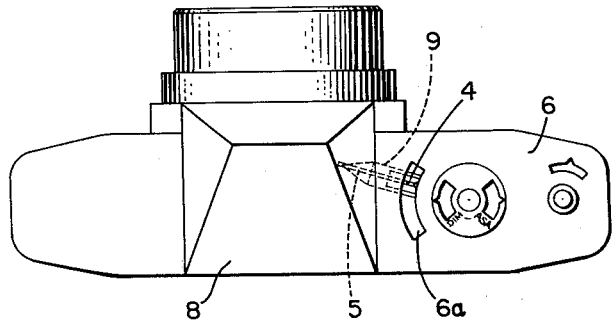
FIG. 2 is a top view of the reflex camera shown in FIG. 1.
Figure 3:
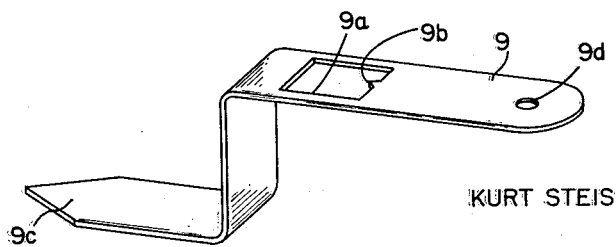
FIG. 3 is an isometric view of the follow-up pointer.

A pair of straight pointers 4 and 5 are arranged on the axle journals 1 and 2 of the electric measuring instrument 3 of a photoelectric exposure meter. Pointer 4 projects into the field of a window-like aperture 6a of a camera housing cover 6 and may thus be observed through this aperture. The pointer 5 projects through an aperture 7a of a housing 7 for the finder-lens system of the camera, illustrated as a single-lens reflex system, for example of the type shown in U.S. Patent No. 2,887,019. Pointer 5 projects approximately into the viewfinder real image plane of the reflex viewer system and therefore may be observed, together with the viewer image, through the usual pentaprism 8.

U.S. Patent No. 2,887,019, which is cited above, is referred to as an example of a viewfinder system having a real image plane. Any viewfinder having a real image plane approximately into which pointers could be positioned is satisfactory for practicing this invention. Any terrestrial telescopic viewfinder has a real image plane, and a pointer, such as pointer 5, located approximately therein is clearly observable simultaneously with the image through the viewfinder eyepiece.

A follow-up pointer 9, which is coupled to the setting member for exposure time and/or diaphragm opening, is expediently pivoted at 9d co-axially with the instrument pointers 4 and 5 in the camera housing. The follow-up pointer 9 is provided with a window-like aperture 9a through which one instrument pointer 4 may be observed for matching it with an index mark 9b that is formed on one edge of aperture 9a. The follow-up pointer 9 is bent in such a way that its free end 9c, which is formed as a pointer, projects through the aperture 7a into the lens housing 7, so that it may be observed, together with the other instrument pointer 5, through the pentaprism 8. A typical coupling of the follow-up pointer 9 to one or more exposure regulating members in the camera is illustrated in U.S. Patent No. 2,343,690.

It is obvious that it is not necessary to arrange the two instrument pointers 4 and 5 so that they extend in the same direction from the axle journals 1 and 2 of the instrument 3. Instead, these pointers may be angularly displaced relative to each other, should such arrangement be more favorable for adapting the pointer system to the space limitations of the camera housing.

The invention has been described in detail with particular reference to a preferred embodiment thereof, but it will be understood that variations and modifications can be effected within the spirit and scope of the invention as described hereinabove and as defined in the appended claims.

I claim:

1. In a camera having a follow-up pointer type exposure control system, a cover with a viewing window, and an exposure meter constituting a part of said exposure control system and including a coil adapted for automatic angular movement as a function of scene brightness, the combination comprising: a viewfinder including an optical system having a real image plane; a first pointer secured to said coil for angular movement therewith and having a free end underlying said window for observation through the latter; a second pointer secured to said coil for angular movement therewith and having a free end extending approximately into said real image plane of said optical system for observation in said viewfinder through at least a part of said optical system; and a follow-up pointer manually adjustable into alignment with both said first and second pointers and observable through both said window and said viewfinder, said follow-up pointer having a free end extending approximately into said real image plane, and said follow-up pointer extending between said first pointer and said window and having an aperture aligned with said window, one edge of said aperture defining a reference pointer for alignment with said first pointer.

2. The combination defined in claim 1, wherein each of said first and second pointers comprises a straight member and said follow-up pointer comprises a member having a pivotally mounted end, a free end visible in said viewfinder and two right-angle bends intermediate said aperture and said free end, said right-angle bends being arranged for allowing said follow-up pointer to be positioned near both said window and said real image plane.

3. The combination defined in claim 1, wherein said follow-up pointer and said coil are coaxially pivoted.

4. The combination defined in claim 1, wherein said viewfinder optical system comprises a reflex system.

References Cited in the file of this patent
UNITED STATES PATENTS

| | | |
|---|---|---|
| 2,242,043 | Sanger | May 13, 1941 |
| 2,297,428 | Nuchterlein | Sept. 29, 1942 |
| 2,754,735 | Meyer | July 17, 1956 |
| 2,920,542 | Engelsmann | Jan. 12, 1960 |
| 2,932,242 | Greger | Apr. 12, 1960 |
| 2,933,991 | Sauer | Apr. 26, 1960 |
| 2,960,921 | Greger | Nov. 22, 1960 |